United States Patent
Otani

(10) Patent No.: US 10,343,360 B2
(45) Date of Patent: *Jul. 9, 2019

(54) TIRE MEMBER-FORMING APPARATUS

(71) Applicant: Sumitomo Rubber Industries, Ltd., Kobe-shi, Hyogo (JP)

(72) Inventor: Masafumi Otani, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/116,092

(22) PCT Filed: Jan. 15, 2015

(86) PCT No.: PCT/JP2015/050860
§ 371 (c)(1),
(2) Date: Aug. 2, 2016

(87) PCT Pub. No.: WO2015/125519
PCT Pub. Date: Aug. 27, 2015

(65) Prior Publication Data
US 2017/0165934 A1  Jun. 15, 2017

(30) Foreign Application Priority Data
Feb. 24, 2014  (JP) .................. 2014-033191

(51) Int. Cl.
*B29D 30/30* (2006.01)
*B29D 30/20* (2006.01)
(Continued)

(52) U.S. Cl.
CPC .............. *B29D 30/30* (2013.01); *B29B 11/10* (2013.01); *B29D 30/20* (2013.01);
(Continued)

(58) Field of Classification Search
CPC ........ B29D 30/60; B29D 30/30; B29D 30/00; B29D 30/08; B29D 30/20; B29D 30/24; B29D 30/0016; B29D 30/2607
(Continued)

(56) References Cited

U.S. PATENT DOCUMENTS 4,233,013 A * 11/1980 Bohm ................. B29C 35/0277
156/123
4,330,116 A * 5/1982 Newsome ............. B65H 29/14
271/178
(Continued)

FOREIGN PATENT DOCUMENTS

DE   10 2005 046 115 A1   3/2007
JP         5-131565 A       5/1993
(Continued)

OTHER PUBLICATIONS

Noboru Ishihara, JP 2011194737, machine translation. (Year: 2011).*
(Continued)

*Primary Examiner* — Robert C Dye
*Assistant Examiner* — Sedef E Paquette
(74) *Attorney, Agent, or Firm* — Birch, Stewart, Kolasch & Birch, LLP

(57) ABSTRACT

The present invention glues a rubber strip on the surface of a non-right circular cylindrical winding body with good precision. The present invention reduces the space occupied by the apparatus. The tire member-forming apparatus is provided with a transport conveyor with a conveyor belt that is guided by guide rollers so that the conveyor belt is able to circle. The conveyor surface of the conveyor belt is provided with a conveyor surface width center line that extends in a straight line over the entire length thereof. The guide rollers are grouped into guide rollers on the front side of the conveyor direction and guide rollers on the back side of the
(Continued)

conveyor direction. The front guide rollers are held so as to be capable of tilting around the conveyor surface width center line. As a result, on the conveyor surface, a twistable twisting conveyor surface section is formed between a front conveyor surface section, which is supported by the front guide rollers, and a back conveyor surface section, which is supported by the back guide rollers.

4 Claims, 9 Drawing Sheets

(51) Int. Cl.
    *B29D 30/60*     (2006.01)
    *B29B 11/10*     (2006.01)
    *B29D 30/08*     (2006.01)
    *B29D 30/24*     (2006.01)

(52) U.S. Cl.
    CPC ......... *B29D 30/3028* (2013.01); *B29D 30/60* (2013.01); *B29D 30/08* (2013.01); *B29D 30/24* (2013.01); *B29D 2030/3085* (2013.01)

(58) Field of Classification Search
    USPC ....................................... 156/397, 117, 394.1
    See application file for complete search history.

(56) References Cited

U.S. PATENT DOCUMENTS

| | | | |
|---|---|---|---|
| 4,963,207 A | 10/1990 | Laurent | |
| 5,032,701 A * | 7/1991 | Umetsu | B23H 7/10 219/69.12 |
| 5,335,415 A | 8/1994 | Okufuji | |
| 5,395,475 A | 3/1995 | Ozawa et al. | |
| 2006/0081325 A1* | 4/2006 | Hayashi | B29D 30/30 156/117 |
| 2007/0107848 A1* | 5/2007 | Hayashi | B29D 30/30 156/394.1 |
| 2011/0005660 A1* | 1/2011 | Ogawa | B29D 30/1628 156/117 |
| 2011/0036484 A1* | 2/2011 | Sangiovanni | B29D 30/16 156/117 |
| 2011/0232830 A1* | 9/2011 | Rey | B29D 30/16 156/111 |
| 2014/0174637 A1 | 6/2014 | Chevaux | |
| 2015/0298412 A1 | 10/2015 | Nakamura | |

FOREIGN PATENT DOCUMENTS

| | | | |
|---|---|---|---|
| JP | 2003-334867 A | | 11/2003 |
| JP | 2006-110856 A | | 4/2006 |
| JP | 2006-159443 A | | 6/2006 |
| JP | 2006-347003 A | | 12/2006 |
| JP | 2011-183698 A | | 9/2011 |
| JP | 2011-194737 A | | 10/2011 |
| JP | 2011194737 A | * | 10/2011 |
| JP | 2013-226677 A | | 11/2013 |
| JP | 2014073590 A | * | 4/2014 |
| WO | WO 2012/153057 A1 | | 11/2012 |
| WO | WO 2014/103621 A1 | | 7/2014 |

OTHER PUBLICATIONS

Ulrich Geffert, DE 102005046115, machine translation. (Year: 2006).*

Hiroyuki Onimatsu, JP-2014073590, machine translation. (Year: 2014).*

International Search Report issued in PCT/JP2015/050860, dated Apr. 21, 2015.

Written Opinion of the International Searching Authority issued in PCT/JP2015/050860, dated Apr. 21, 2015.

Extended European Search Report dated Oct. 19, 2017, in European Patent Application No. 15751582.6.

* cited by examiner

TIRE MEMBER-FORMING APPARATUS

TECHNICAL FIELD

The present invention relates to a tire member-forming apparatus that sticks a rubber strip on a periphery of a non-straight cylindrical wound body with a high accuracy.

BACKGROUND ART

As a method for forming a rubber member in pneumatic tires, there is known a strip-winding technique using an unvulcanized rubber strip. According to the technique, the rubber strip is continuously wound around a surface of the wound body as a tire former or the like in a tire circumferential direction to form an annular rubber member (for example, a tread rubber, a sidewall rubber, or the like). In the strip-winding technique, various cross-section shapes can be obtained by changing the winding pitch of the rubber strip or the number of times when the rubber strip is wound.

Patent Literature 1 shown below proposes a rubber strip-forming apparatus (a) for use in the strip-winding technique as illustrated in FIG. 9. The forming apparatus (a) is configured to stick a rubber strip G with a high accuracy on the surface of a wound body (b) of a non-straight cylindrical shape such as a drum shape, for example. The forming apparatus (a) includes a rubber strip transport conveyor (c).

Specifically, the forming apparatus (a) includes:

(1) a lateral moving means (gx) that moves the transport conveyor (c) laterally along an X-axis direction parallel to an axis (bi) of the wound body (b);

(2) a vertical moving means (gy) that moves the transport conveyor (c) forward or backward toward the wound body (b) along a Y-axis direction; and (3) a turning means (gz) that turns the transport conveyor (c) around an axis (Zi) in the vertical Z-axis direction.

Accordingly, even when the wound body (b) has a non-straight cylindrical profile, a guide roller (e) positioned on the foremost side in the transport direction of the transport conveyor (c) can be freely inclined in accordance with the profile. This makes it possible to stick the rubber strip G with a high accuracy without causing wrinkles or large distortion such as uneven stretch.

According to this structure, however, the long transport conveyor (c) entirely turns around the vertical axis (Zi). This requires a large space for the turning, which makes it difficult to install the forming apparatus adjacent to another forming apparatus. In addition, in the inside area of the turning radius, the work area for workers needs to be significantly limited due to a fear of collision with the transport Conveyor©, which leads to a disadvantage in work efficiency.

CITATION LIST

Patent Literature

Patent Literature 1: Japanese Unexamined Patent Application Publication No. 2006-110856

SUMMARY OF INVENTION

Technical Problem

An object of the present invention is to reduce an apparatus footprint to enable installation adjacent to another forming apparatus and increase the work area for workers.

Another object of the present invention is to provide a tire member-forming apparatus that allows a rubber strip to be stuck with a high accuracy on the surface of a non-straight cylindrical wound body.

Solution to Problem

The present invention provides a tire member-forming apparatus including a drum device including a wound body rotatably driven and having a non-straight cylindrical shape around which a rubber strip is wound, a rubber strip supply device to supply the rubber strip and a rubber strip sticking device including an applicator transporting the rubber strip supplied from the rubber strip supply device and winding the same around the wound body. The applicator includes a transport conveyor including a transport belt for transporting the rubber strip on a transport surface, the transport belt being guided by a plurality of guide rollers in a manner capable of circling. The transport surface includes a center line in a width direction extending linearly over the entire length of the transport surface. The guide rollers include front guide rollers including a foremost guide roller disposed on the foremost side of the transport direction and back guide rollers including a backmost guide roller disposed on the backmost side of the transport direction. The front guide rollers are held in a manner capable of tilting around the center line of the transport surface in the width direction so that the transport surface forms a twistable transport surface portion between a front transport surface portion supported by the front guide rollers and a back transport surface portion supported by the back guide rollers.

In the tire member-forming apparatus according to the invention, it is preferable that the rubber strip supply device includes a rubber extruder including a gear pump capable of quantitatively extruding rubber and an extrusion head that pre-shapes the rubber extruded from the gear pump.

In the tire member-forming apparatus according to the invention, it is preferable that the back guide rollers are supported by a first frame and the front guide rollers are supported by a second frame held at the first frame in a manner capable of tilting around the center line of the transport surface in the width direction.

In the tire member-forming apparatus according to the invention, it is preferable that the applicator includes a press conveyor having a press belt guided by a plurality of upper guide rollers in a manner capable of circling and presses the rubber strip against the transport belt, and the press belt includes a press surface that is composed of a front press surface portion pressing the rubber strip against the front transport surface portion, a back press surface portion pressing the rubber strip against the back transport surface portion, and a twistable press surface portion pressing the rubber strip against the twistable transport surface portion.

In the tire member-forming apparatus according to the invention, it is preferable that the rubber strip supply device has a lateral movement stage supported movably in a direction parallel to an axis of the wound body, and the applicator is attached to the lateral movement stage.

Advantageous Effects of Invention

The tire member-forming apparatus according to the present invention includes the transport conveyor having the transport belt for transporting the rubber strip, and the transport surface of the transport belt has the center line in the width-direction extending linearly along its entire length.

When the guide rollers supporting the transport belt in such a manner as to be capable of circling are classified, in a transport-direction, into the front guide rollers and the transport-direction back guide rollers, the front guide rollers are held in such a manner as to be capable of tilting around the center line of the transport surface. Accordingly, the transport surface can form the twistable transport surface portion between the front transport surface portion supported by the front guide rollers and the back transport surface portion supported by the back guide rollers.

The thus configured transport conveyor can incline freely the foremost guide roller in accordance with the profile of the wound body by the tilting around the center line of the transport surface. Accordingly, the rubber strip can be stuck with a high accuracy without causing wrinkles, uneven stretch, or the like. In addition, the transport surface includes the center line of the transport surface extending linearly over its entire length. This makes it possible to transport the rubber strip stably with a high accuracy without causing a change in the length of the rubber strip, following the tilting of the transport-direction foremost guide roller.

The transport conveyor does not turn around the vertical axis but tilts around the center line of the transport surface. This eliminates the need for a large turning space and reduces the footprint of the apparatus. Accordingly, the forming apparatus can be installed adjacent to another forming apparatus. In addition, it is possible to increase the work area while maintaining the safety of the workers, thereby contributing to improvement in the efficiency of the sticking work.

DESCRIPTION OF EMBODIMENTS

Figure 1:
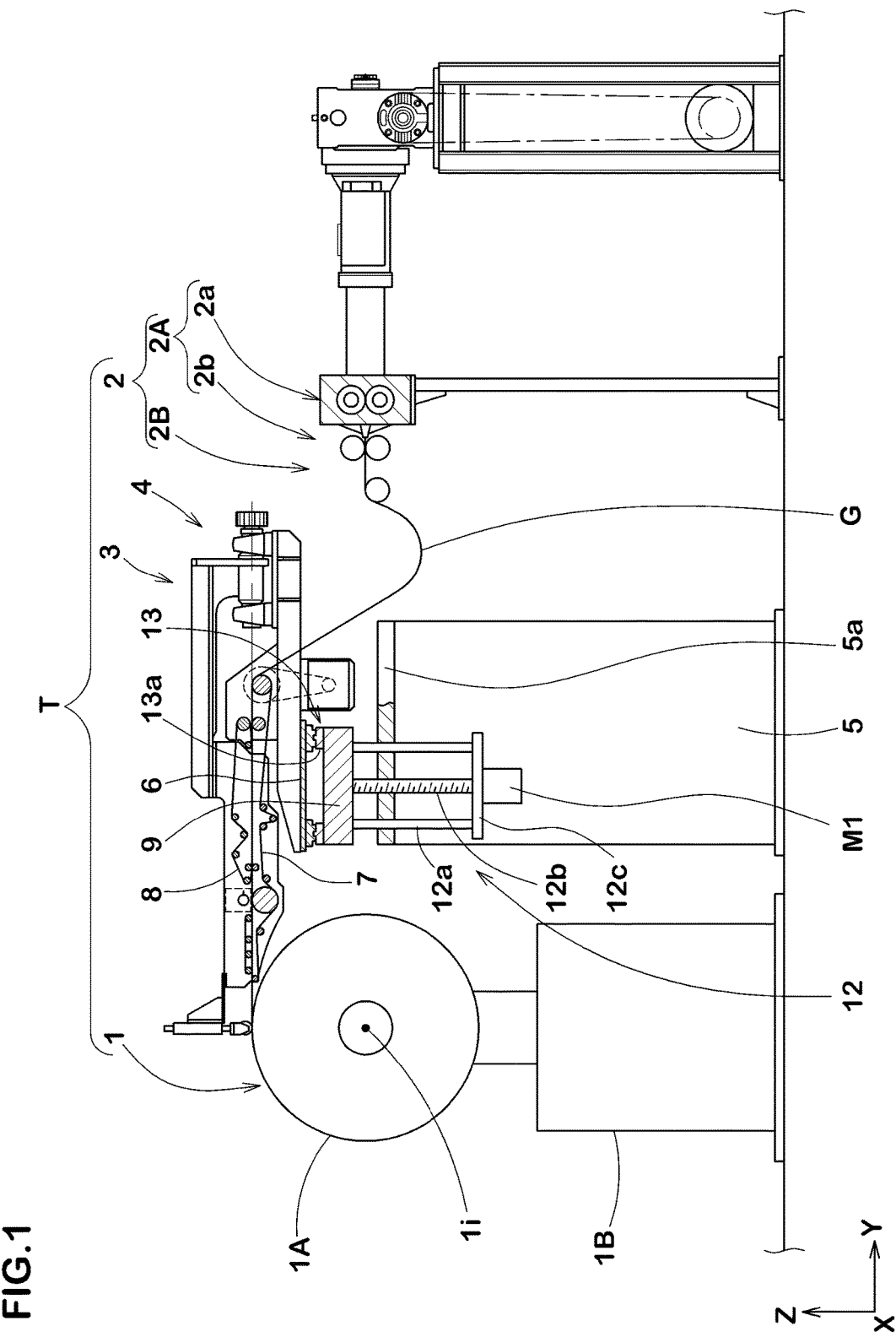
FIG. 1 is a side view of an embodiment of a tire member-forming apparatus of the present invention.

An embodiment of the present invention will be described below in detail. FIG. 1 is a side view of a tire member-forming apparatus T of the embodiment of the present invention. As illustrated in FIG. 1, the tire member-forming apparatus T (hereinafter, also referred to as "forming apparatus T") includes a drum device 1, a rubber strip supply device 2, and a rubber strip sticking device 3. An unvulcanized rubber strip G is wrapped around the drum device 1. The rubber strip supply device 2 supplies the rubber strip G. The rubber strip sticking device 3 sticks the rubber strip G supplied from the rubber strip supply device 2 to the drum device 1.

The drum device 1 includes a rotationally driven wound body 1A and a support means 1B rotatably supporting the wound body 1A.

In this example, the wound body 1A is a tire former, and the rubber strip G is wrapped around the wound body 1A to form a rubber member as a tread rubber or the like, for example. The wound body 1A includes a non-straight cylindrical profile such as a drum shape in accordance with the tire shape, for example. The rubber strip G may have a cord embedded therein. In this case, a tire band layer is formed.

The rubber strip supply device 2 has a known structure. The rubber strip supply device 2 of the embodiment includes a rubber extruder 2A with a screw and a roller head 2B disposed on the discharge side of the rubber extruder 2A. The rubber extruder 2A includes a gear pump 2a capable of quantitatively extruding rubber and an extrusion head 2b that pre-shapes the rubber extruded from the gear pump 2a. The rubber extruder 2A operates intermittently in accordance with the forming cycle of the forming apparatus T to form the rubber strip G only at the time of need. The rubber strip G shaped by the rubber extruder 2A is supplied at a relatively high-temperature and in a high-viscosity state to the wound body 1A. Therefore, the high-rigidity tire member can be manufactured.

The roller head 2B has a pair of calendar rollers. The calendar rollers extrude the pre-shaped rubber kneaded by rotation of the screw and extruded from the extrusion head 2b of the rubber extruder 2A and shapes the same into the rubber strip G. In the embodiment, a festoon is provided on the downstream side of the roller head 2B to hold the rubber strip G in a U-shaped loose state.

The rubber strip G for use in the forming apparatus T of the embodiment is a long belt-like tape body in which the cross section has a thickness of about 0.5 to 4.0 mm and a width of about 5 to 35 mm, for example.

The rubber strip sticking device 3 (hereinafter, also called simply "sticking device 3") includes an applicator 4 that transports the rubber strip G and winds the same around the wound body 1A. In this example, the sticking device 3 includes a base stand 5, a lifting stage 9 supported by the base stand 5 in a manner capable of vertical movement, and a lateral movement stage 6 supported by the lifting stage 9 in a manner capable of lateral movement. The applicator 4 is attached to the lateral movement stage 6. The lifting stage 9 is supported via a lifting means 12 in a manner capable of vertical movement. In this example, the lifting means 12 includes a pair of vertical guide shafts 12a and a vertical ball screw shaft 12b. The upper ends of the guide shafts 12a are fixed to the lifting stage 9 and the lower ends of the same are fixed to a lower plate 12c. The ball screw shaft 12b is pivotally supported in a rotatable manner by the lifting stage 9 and the lower plate 12c. The lower end portion of the ball screw shaft 12b is coupled to a lifting motor M1 attached to the lower plate 12c. The base stand 5 includes a support plate part 5a having guide holes into which the guide shafts 12a are inserted and a screw hole into which the ball screw shaft 12b is screwed.

Figure 2:
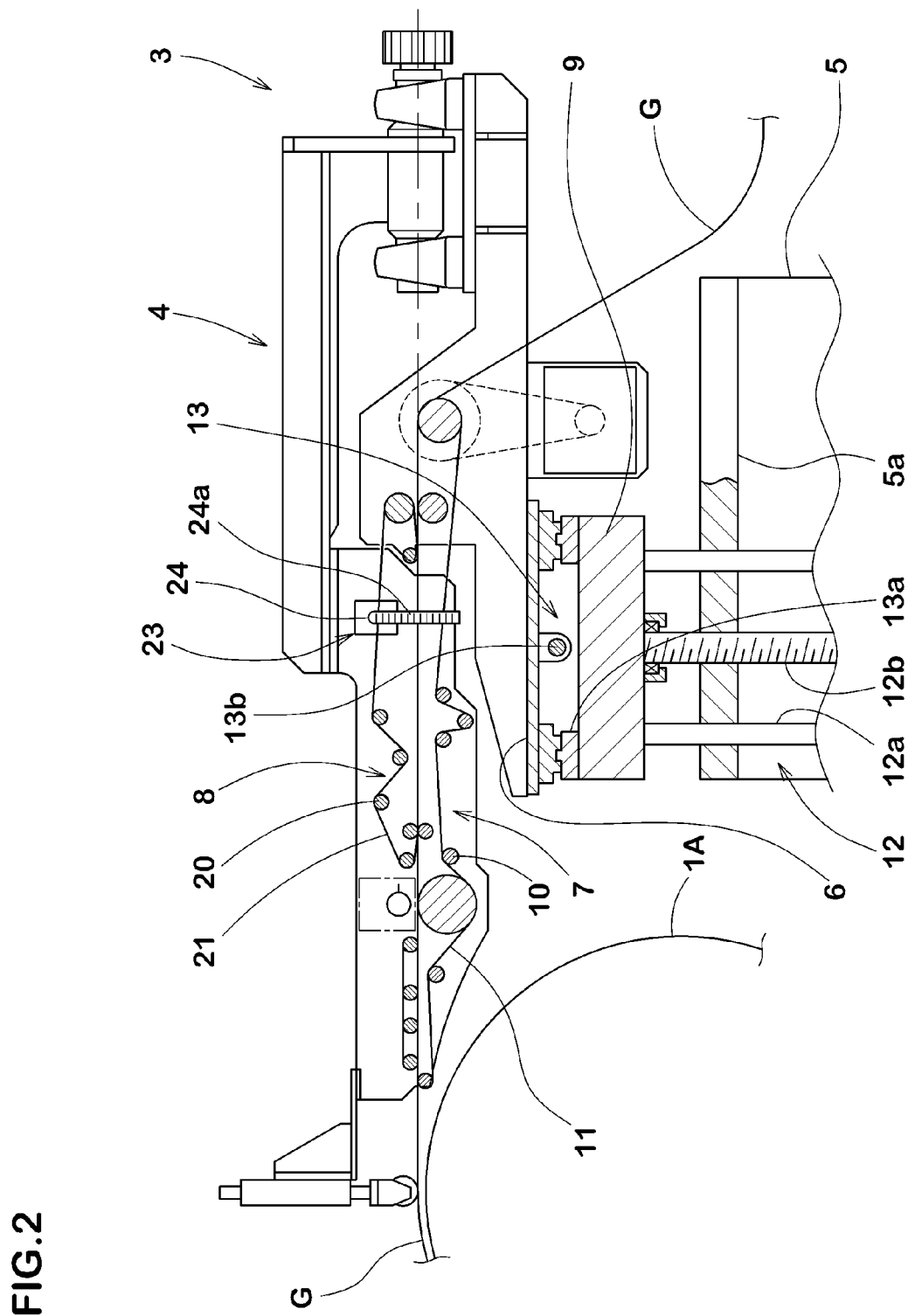
FIG. 2 is an enlarged side view of an applicator.

In this example, the lateral movement stage 6 is supported movably in an X-axis direction parallel to an axis 1i of the wound body 1A via a lateral movement means 13. As illustrated in FIG. 2, the lateral movement means 13 of this example includes guide rails 13a and a ball screw shaft 13b arranged on the lifting stage 9 in the X-axis direction. One end of the ball screw shaft 13b is coupled to a lateral movement motor (not illustrated) attached to the lifting stage 9. The lateral movement stage 6 is provided with a guide portion guided by the guide rail 13a and a nut portion screwed into the ball screw shaft 13b. Therefore, the applicator 4 can be freely changed in position in the vertical direction (Z-axis direction) and the lateral direction (X-axis direction) by driving of the lifting motor M1 and the lateral movement motor.

Next, the applicator 4 includes at least a transport conveyor 7 supported in a manner capable of moving integrally with the lateral movement stage 6. In this example, the applicator 4 includes the transport conveyor 7 and a press conveyor 8 disposed above the transport conveyor 7.

Figure 3:
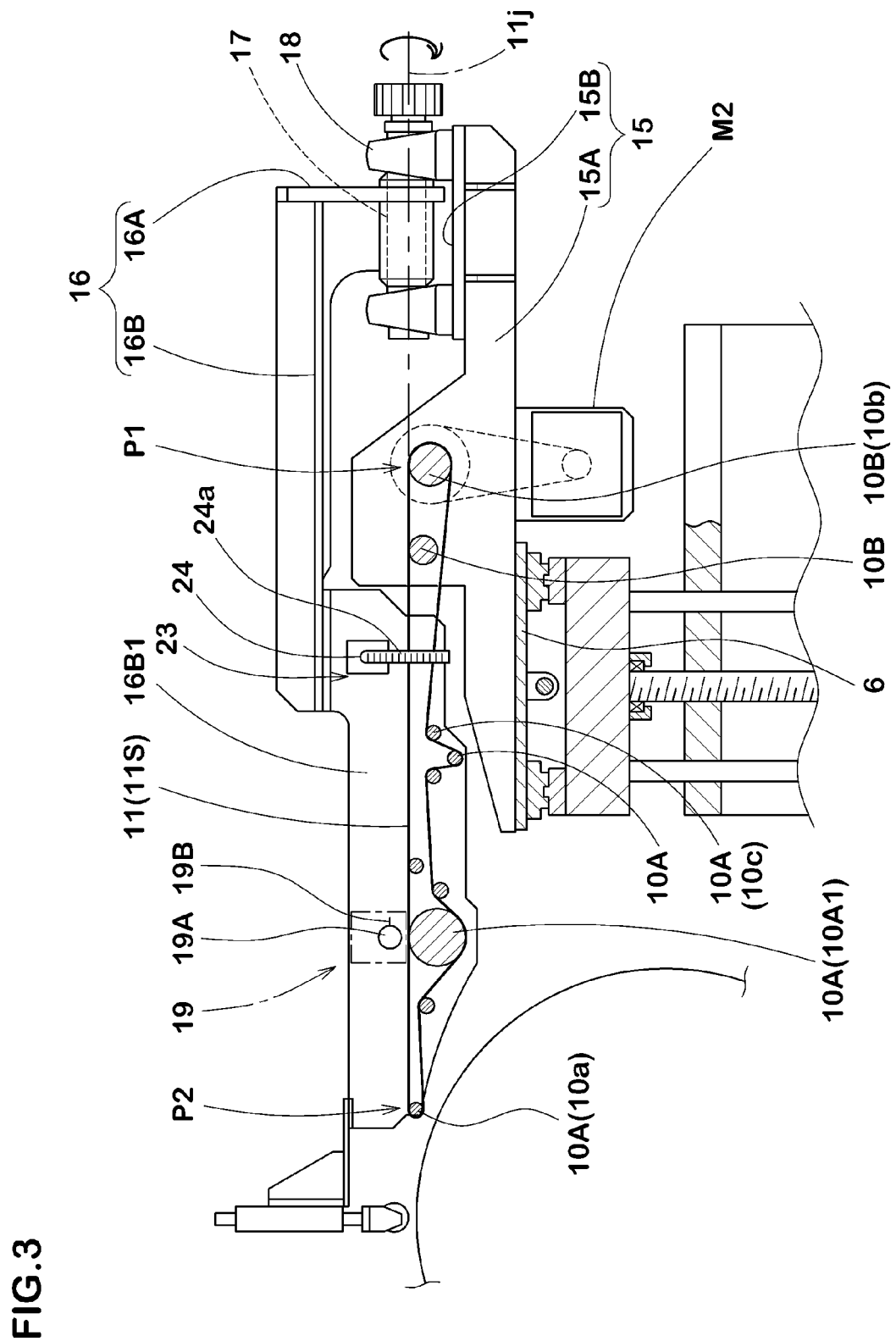
FIG. 3 is a side view of a transport conveyor.
Figure 4:
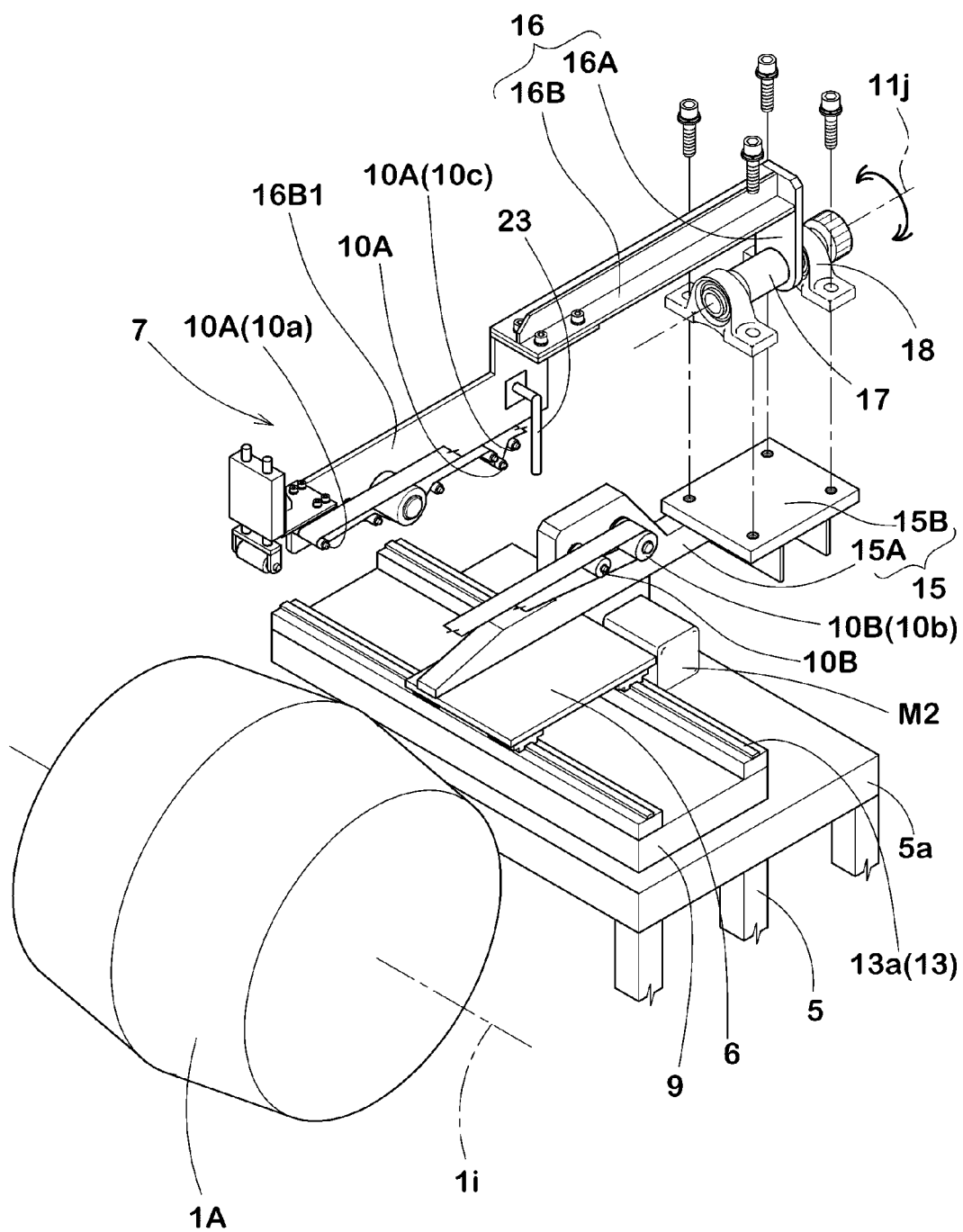
FIG. 4 is an exploded perspective view of the transport conveyor.

The transport conveyor 7 includes a plurality of guide rollers 10 and a transport belt 11 guided by the guide rollers 10 in a manner capable of circling. As illustrated in FIGS. 3 and 4, the transport belt 11 has the upper surface as a transport surface 11S. The rubber strip G on the transport surface 11S is transported from a position P1 of receiving from the rubber strip supply device 2 to a position P2 of discharge toward the wound body 1A. As conceptually illustrated in FIG. 5, the center line of the transport surface 11S in a width-direction extends linearly over the entire length of the transport surface 11S. That is, the transport surface 11S includes the center line 11j of the transport surface extending linearly over its entire length.

Figure 5:
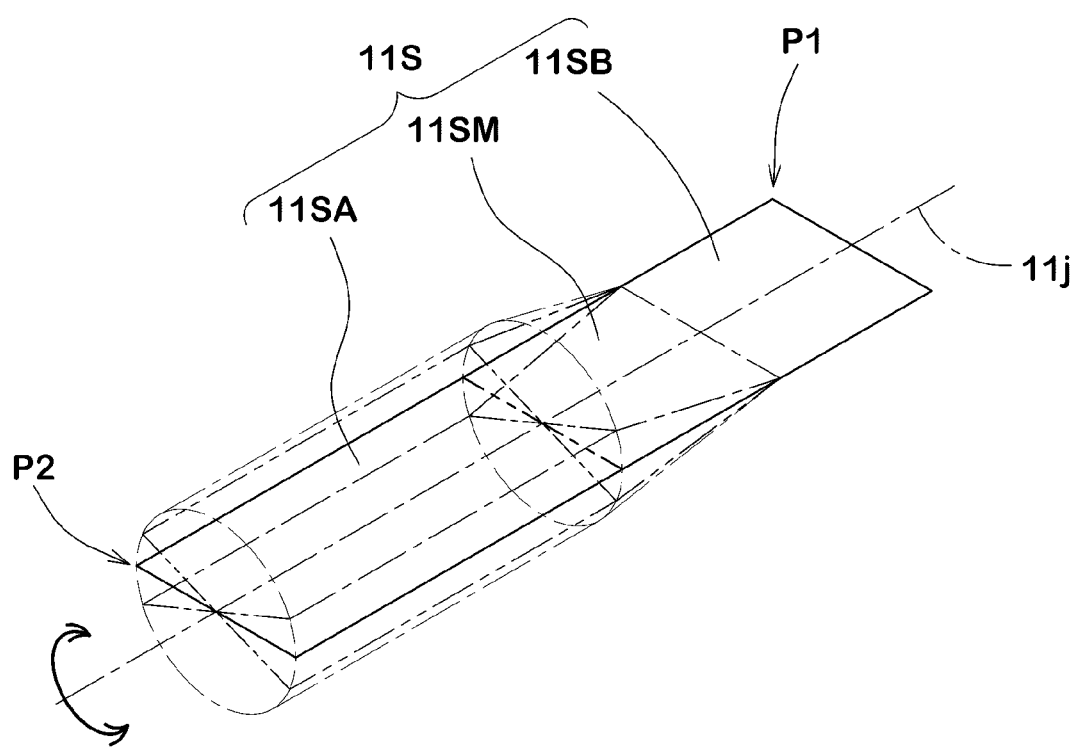
FIG. 5 is a conceptual view of a transport surface.

Next, as illustrated in FIG. 3, a plurality of guide rollers 10 is classified into front guide rollers 10A including a foremost guide roller 10a disposed on the foremost side of the transport direction and back guide rollers 10B including a backmost guide roller 10b disposed on the backmost side of the transport direction. The front guide rollers 10A are held in a manner capable of tilting around the center line 11j of the transport surface in the width-direction. Accordingly, the transport surface 11S has a front transport surface portion 11SA, a back transport surface portion 11SB, and a twistable transport surface portion 11SM twistable around the center line 11j of the transport surface in the width-direction as illustrated in FIG. 5. The front transport surface portion 11SA is supported by the front guide rollers 10A. The back transport surface portion 11SB is supported by the back guide rollers 10B. The twistable transport surface portion 11SM is formed between the front transport surface portion 11SA and the back transport surface portion 11SB.

Specifically, the applicator 4 includes a first frame 15 that is fixed to the lateral movement stage 6 in a manner capable of moving integrally with the lateral movement stage 6 and a second frame 16 that is held by the first frame 15 in a manner capable of tilting around the center line 11j of the transport surface in the width-direction.

The first frame 15 has a side plate-like base part 15A that stands at one side edge of the lateral movement stage 6. The base part 15A extends backward beyond the back end of the lateral movement stage 6. The back end side of the base part 15A has an attachment plate part 15B to which the second frame 16 is attached. The base part 15A is attached horizontally, for example. The back guide rollers 10B are pivotally supported by the base part 15A.

The second frame 16 has a support shaft 17 concentric with the center line 11j of the transport surface in the width-direction. The support shaft 17 is pivotally supported by a bearing holder 18 attached to the attachment plate part 15B in a manner rotatable around the center line 11j of the transport surface in the width-direction. In addition, the second frame 16 of this example includes a back plate part 16A fixed and attached to the support shaft 17 and a front plate part 16B that bends from the upper end of the back plate part 16A, for example, and extends forward. The front plate part 16B has a side plate portion 16B1 parallel to the base part 15A on the front end side. The front guide rollers 10A are pivotally supported by the side plate portion 16B1.

The support shaft 17 is coupled to a drive motor (not illustrated) that is controllable in rotational angle such as a step motor, for example. A drive motor M2 is coupled to the backmost guide roller 10b. This allows the transport belt 11 to be driven and circled.

A cutting means 19 is disposed on the second frame 16 to cut the rubber strip G on the front transport surface portion 11SA. The cutting means 19 of this example includes a rotationally driven rotation shaft 19A and a cutter blade 19B that extends from the peripheral surface of the rotation shaft 19A in a radially outward direction. The cutting means 19 can cut the rubber strip G while transporting the same, by the cutter blade 19B making a single rotation at the same speed as the rubber strip G. A relatively large-diameter guide roller 10A1 is disposed under the cutter blade 19B to support the transport belt 11 from beneath at the time of cutting.

Figure 6:
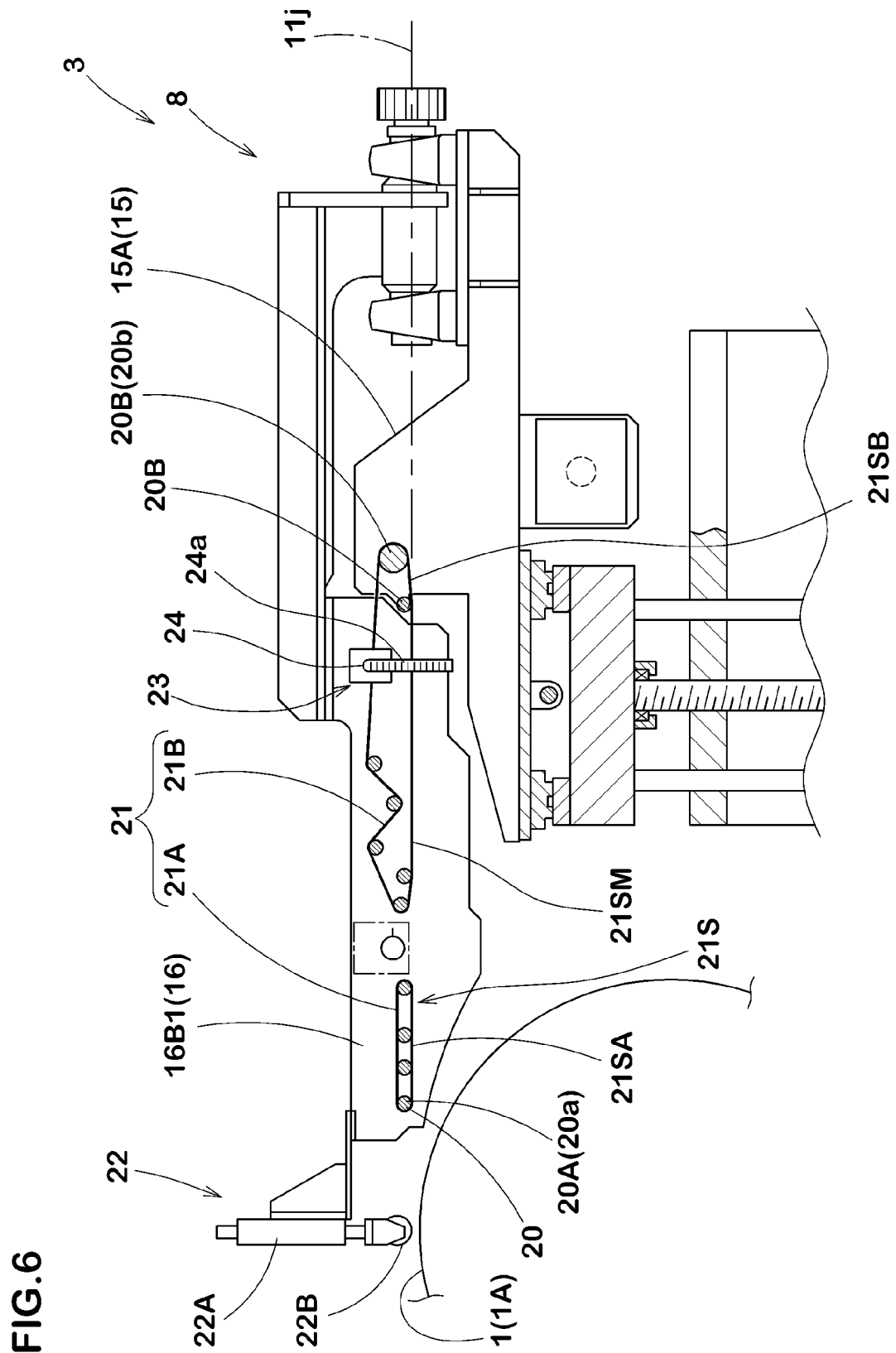
FIG. 6 is a side view of a press conveyor.

As illustrated in FIG. 6, the press conveyor 8 includes a plurality of upper guide rollers 20 and a press belt 21 guided by the upper guide rollers 20 in a manner capable of circling. The press belt 21 presses the rubber strip G against the transport belt 11. This prevents the rubber strip G from being separated or shifted in position from the transport belt 11 or being slipped on the transport belt 11. The press belt 21 has a press surface 21S formed by a front press surface portion 21SA, a back press surface portion 21SB, and a twistable press surface portion 21SM. The front press surface portion 21SA presses the rubber strip G against the front transport surface portion 11SA. The back press surface portion 21SB presses the rubber strip G against the back transport surface portion 11SB. The twistable press surface portion 21SM presses the rubber strip G against the twistable transport surface portion 11SM.

Specifically, the upper guide rollers 20 are divided into front upper guide rollers 20A and back upper guide rollers 20B. The front upper guide rollers 20A include a foremost upper guide roller 20a disposed on the foremost side of the transport direction. The back upper guide rollers 20B include a backmost upper guide roller 20b disposed on the backmost side of the transport direction. The back upper guide rollers 20B are pivotally supported by the base part 15A of the first frame 15 as the back guide rollers 10B. The front upper guide rollers 20A are pivotally supported by the side plate part 16B1 of the second frame 16 as the front guide rollers 10A.

In this example, the press belt 21 is formed from a back press belt 21B disposed on the back side of the cutting means 19 and a front press belt 21A disposed on the front side of the cutting means 19.

In this example, the sticking device 3 includes a press-fit means 22 on the front side of the press conveyor 8. The press-fit means 22 presses the rubber strip G stuck on the wound body 1A against the wound body 1A such that the rubber strip G is fitted to the wound body 1A. The press-fit means 22 includes a pressure roller 22B pivotally supported at the rod lower end of a cylinder 22A via a holder. The cylinder 22A is supported by the side plate part 16B1 of the second frame 16. The pressure roller 22B is pivotally attached in parallel to the front guide rollers 10A. Therefore, the pressure roller 22B is capable of tilting around the center line 11j of the transport surface in the width-direction, and inclines in accordance with the profile of the wound body 1A to press-fit the rubber strip G.

Figure 7A:
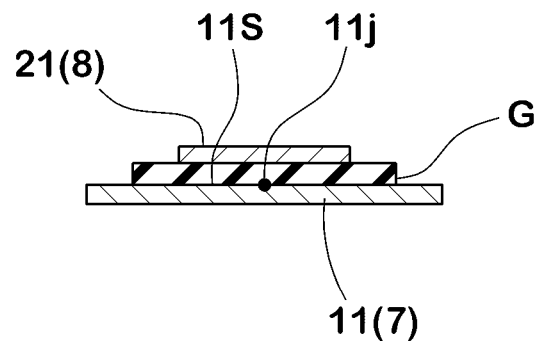
FIGS. 7A to 7C are illustrative diagrams describing the turning of the transport conveyor around a center line of the transport surface in a width-direction.
Figure 7B:
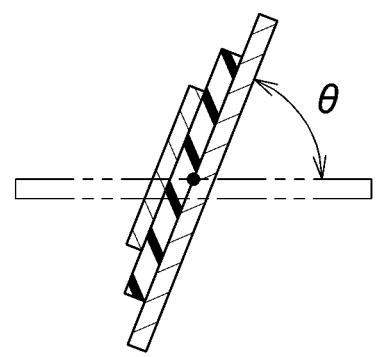
Figure 7C:
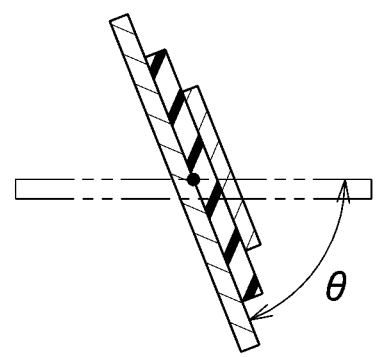

As illustrated in FIG. 7A, the transport belt 11 of the transport conveyor 7 is preferably wider than the rubber strip G. The press belt 21 of the press conveyor 8 is preferably narrower than the rubber strip G. As illustrated in FIGS. 7B and 7C, while the rubber strip G is pressed by the narrow press belt 21, the turning angle θ around the center line 11j of the transport surface in the width-direction around which the belts 11 and 21 can turn without changing the lengths of the belts 11 and 21 is ±80 degrees. In this example, therefore, the turning angle θ ranges −80 to +80 degrees.

As illustrated in FIG. 3, the applicator 4 of the embodiment is provided with a stopper 23 that suppresses dropping of the transport belt 11. That is, the second frame 16 of the applicator 4 tilts around the center line 11j of the transport surface in the width-direction to provide the twistable transport surface portion 11SM as described above. Accordingly, when the second frame 16 tilts such that the opening side of the guide rollers 10A faces downward, the stopper 23 suppresses the dropping of the transport belt 11 off the guide rollers 10A. The stopper 23 is preferably provided on the side plate part 16B1 of the second frame 16 to suppress the dropping of the transport belt 11 off the twistable transport surface portion 11SM. The stopper 23 is more preferably provided to support the side plate part 16B1 on the back side beyond the back roller 10c out of the front guide rollers 10A disposed on the backmost side of the transport direction. The stopper 23 may be configured to support only the transport belt 11, for example, but is desirably configured to support both of the transport belt 11 and the press belt 21 as in the embodiment.

In the embodiment, the stopper 23 has a cylindrical support piece 24 that extends in a direction orthogonal to the rotation axes of the guide rollers 10. The support piece 24 is provided with cut slits 24a that guide the transport belt 11 or the press belt 21.

Figure 8:
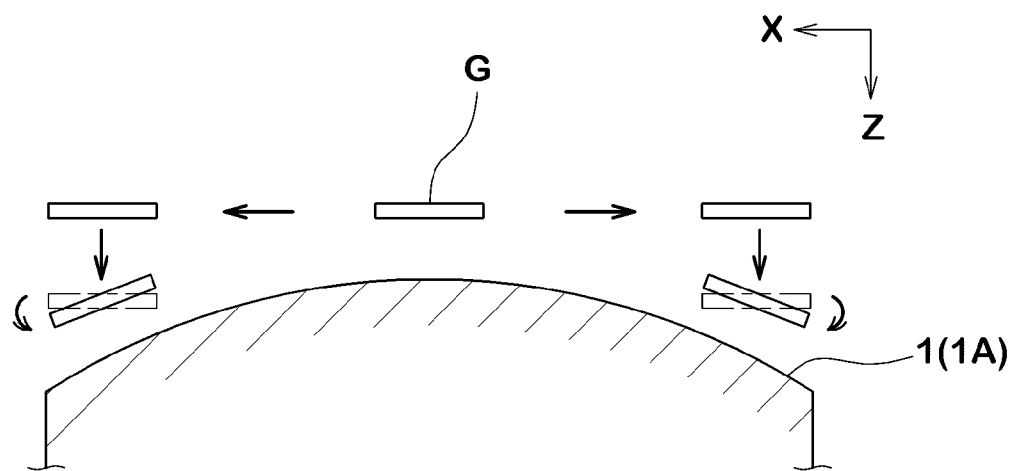
FIG. 8 is an illustrative diagram describing the operation of a sticking device.
Figure 9:
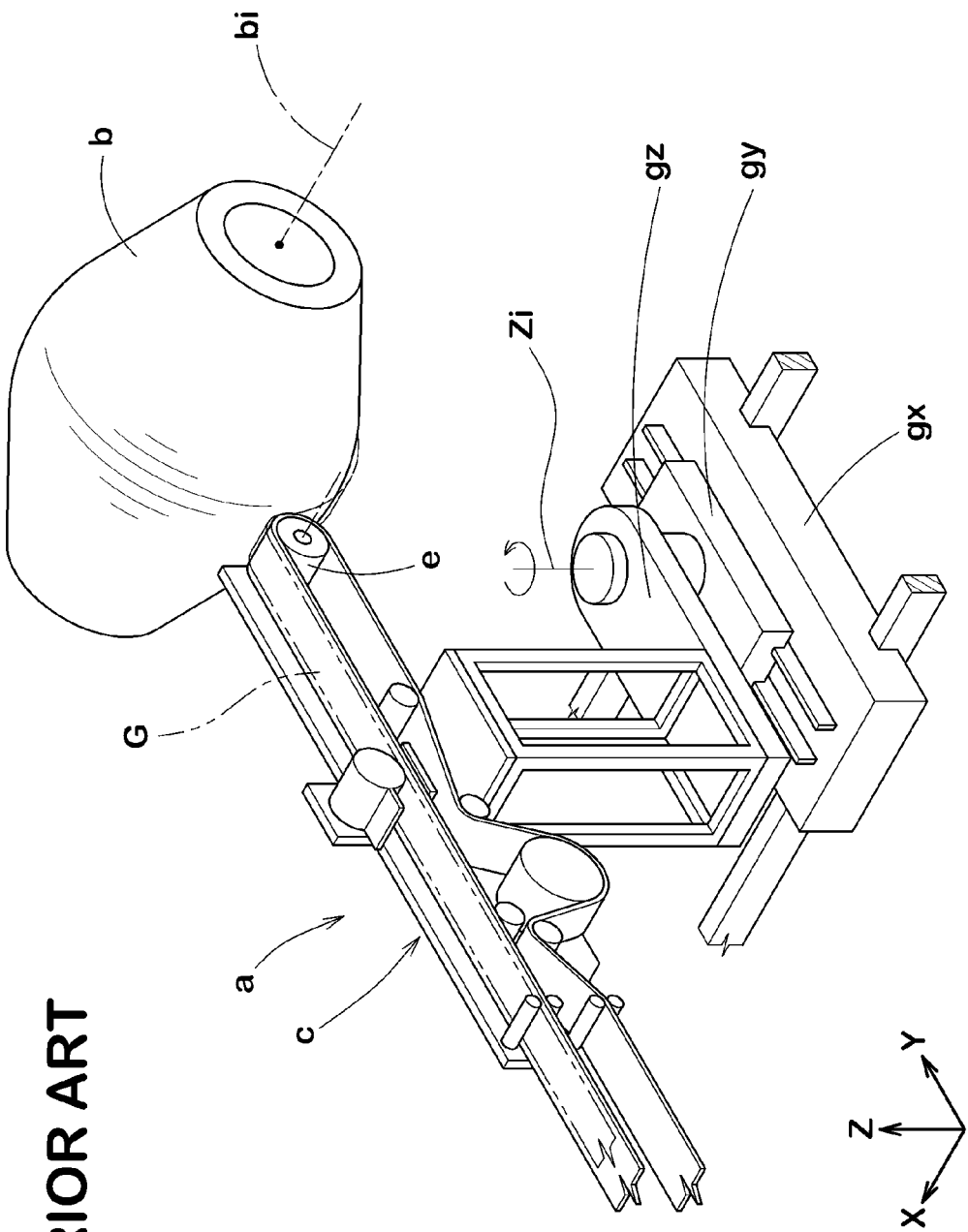
FIG. 9 is a perspective view of a conventional rubber strip sticking device.

The sticking device 3 of this example supports the applicator 4 by the lifting stage 9 and the lateral movement stage 6 such that the applicator 4 can be changed in position in the vertical direction (Z-axis direction) and the lateral direction (X-axis direction). Accordingly, the sticking device 3 can cooperate with the turning operation around the center line 11j of the transport surface in the width-direction to stick the rubber strip G around the non-straight cylindrical wound body 1A with a high accuracy in accordance with the profile of the wound body 1A as illustrated in FIG. 8. Alternatively, instead of the lifting stage 9 and the lateral movement stage 6, the wound body 1A may be supported in a manner capable of moving in the vertical direction (Z-axis direction) and the lateral direction (X-axis direction) with respect to the applicator 4.

The particularly preferred embodiment of the present invention has been described in detail so far. However, the present invention is not limited to the illustrated embodiment but can be modified in various manners.

REFERENCE SIGNS LIST

4 Applicator
7 Transport conveyor
10 Guide roller
10A Front guide roller
10B Back guide roller
11 Transport belt
11S Transport surface
11j Center line of transport surface
11SA Front transport surface portion
11SB Back transport surface portion
11SM Twistable transport surface portion

The invention claimed is:
1. A tire member-forming apparatus comprising:
a drum device comprising a wound body rotatably driven and having a non-straight cylindrical shape around which a rubber strip is wound;
a rubber strip supply device to supply the rubber strip; and
a rubber strip sticking device comprising an applicator transporting the rubber strip supplied from the rubber strip supply device and winding the same around the wound body;
wherein the applicator comprises a transport conveyor comprising a transport belt for transporting the rubber strip on a transport surface, the transport belt being guided by a plurality of guide rollers to turn around the guide rollers;
wherein the transport surface comprises a center line in a width direction extending linearly over the entire length of the transport surface;
wherein the guide rollers comprise front guide rollers comprising a foremost guide roller disposed on the foremost side of the transport direction and back guide rollers comprising a backmost guide roller disposed on the backmost side of the transport direction;
wherein the back guide rollers are supported by a first frame and the front guide rollers are supported by a second frame, the second frame supported by the first frame tiltably around the center line of the transport surface in the width direction so that the transport surface of the transport belt forms a twisted transport surface portion between a front transport surface portion supported by the front guide rollers and a back transport surface portion supported by the back guide rollers,
wherein the applicator comprises a back-side press conveyor, a front-side press conveyor arranged forwardly of the back-side press conveyor in the transport direction for pressing the rubber strip against the transport belt, and a cutting device for cutting the rubber strip,
the back-side press conveyor having a press belt guided by a plurality of upper guide rollers to circle in a loop around the upper guide rollers to press the rubber strip against the transport belt,
wherein the upper guide rollers comprise front upper guide rollers supported by the second frame and back upper guide rollers supported by the first frame to twist the press belt when the second frame is tilted with respect to the first frame in such a manner that the press belt comprises a press surface that is composed of a front press surface portion pressing the rubber strip against the front transport surface portion, a back press surface portion pressing the rubber strip against the back transport surface portion, and a twisted press surface portion pressing the rubber strip against the twisted transport surface portion,
wherein the cutting device is arranged between the front-side press conveyor and the back-side press conveyor,
wherein the cutting device comprises a cutter blade for cutting the rubber strip, and
wherein the front guide rollers comprise a guide roller disposed under the cutter blade to support the transport belt from beneath upon the cutter blade cutting the rubber strip.
2. The tire member-forming apparatus according to claim 1,
wherein the rubber strip supply device comprises a rubber extruder comprising a gear pump capable of quantitatively extruding rubber and an extrusion head that pre-shapes the rubber extruded from the gear pump.

3. The tire member-forming apparatus according to claim 1,
wherein the rubber strip supply device has a lateral movement stage supported movably in a direction parallel to an axis of the wound body, and the applicator is attached to the lateral movement stage.

4. The tire member-forming apparatus according to claim 2,
wherein the rubber strip supply device has a lateral movement stage supported movably in a direction parallel to an axis of the wound body, and the applicator is attached to the lateral movement stage.

\* \* \* \* \*